United States Patent
Diekers

[11] 3,909,716
[45] Sept. 30, 1975

[54] DIGITAL FREQUENCY METER

[75] Inventor: Hermann-Josef Diekers, Einigen, Germany

[73] Assignee: Wandel u. Goltermann, Reutlingen, Germany

[22] Filed: Nov. 26, 1973

[21] Appl. No.: 418,973

[30] Foreign Application Priority Data
Nov. 24, 1972 Germany............................ 2257578

[52] U.S. Cl............................................... 324/78 D
[51] Int. Cl.²......................................... G01R 23/02
[58] Field of Search............... 324/78 D, 78 Q, 79 D

[56] References Cited
UNITED STATES PATENTS

| | | | |
|---|---|---|---|
| 3,325,729 | 6/1967 | Vinzelberg....................... | 324/79 D |
| 3,681,707 | 8/1972 | Bean................................. | 324/79 D |
| 3,689,747 | 9/1972 | DiMilia et al..................... | 324/79 D |
| 3,735,387 | 5/1973 | Miller .............................. | 324/78 D |

*Primary Examiner*—Alfred E. Smith
*Assistant Examiner*—Rolf Hille
*Attorney, Agent, or Firm*—Karl F. Ross; Herbert Dubno

[57] ABSTRACT

To measure the recurrence frequency or cadence of the output of a pulse source, a programmer periodically opens a gate for a predetermined measuring interval during which the pulses are fed to a counter whose reading is to be registered in a numerical indicator. The counter, reset by the programmer after each measuring interval, loads the indicator through a buffer register which stores its reading until an updating pulse from the programmer makes the register receptive to a new count. In one embodiment, such updating is inhibited as long as the stored contents of the register differ by only a unit step from the current count. In another embodiment, the pulse cadence of the source is stepped down by a frequency divider inserted between that source and the counter; prior to each measuring cycle, the divider may be automatically preset by the programmer to an initial position, different from its counter-stepping zero position, depending upon the final position reached in the preceding cycle in order to minimize the possibility of digital errors. A further embodiment includes a timing circuit which determines the period between the end of a preceding measuring interval and the immediately following pulse in order to shift the end of the next measuring interval to a time position approximately midway between two pulses, a delay circuit letting the start of such interval occur a fraction of a pulse cycle after reception of a pulse from the source.

7 Claims, 5 Drawing Figures

DIGITAL FREQUENCY METER

FIELD OF THE INVENTION

My present invention relates to a system for measuring the output frequency of a source of recurrent pulses such as, for example, a signal generator of the type disclosed in commonly owned U.S. Pat. No. 3,249,888.

BACKGROUND OF THE INVENTION

It is known to determine the recurrence frequency or cadence of such a pulse train by passing same to a pulse counter via a metering circuit including a normally closed gate which is periodically opened to establish a measuring interval of fixed duration (e.g., 1 second). The number of pulses counted during that interval represents either the pulse frequency itself or a predetermined fraction (or multiple) thereof.

The accuracy of such frequency measurements depends, of course, upon the exactitude with which the duration of the measuring or gating interval can be maintained. Moreover, unless the length of that interval happens to be an exact multiple of a pulse cycle, relative phase shifts will cause the number of pulses passing through the gate in different measuring intervals to vary by ±1 even if the frequency does not change. The resulting digital error not only simulates a nonexisting frequency instability but also impedes the reading of a numerical indicator which displays the contents of the counter at the end of each measuring interval.

OBJECTS OF THE INVENTION

The general object of my present invention is to provide an improved digital frequency meter of this character.

A more particular object is to provide a frequency meter in which the aforementioned digital error is minimized or completely eliminated.

SUMMARY OF THE INVENTION

A frequency-measuring system according to my invention comprises, in addition to the above-mentioned pulse counter and gate, a buffer register inserted in the measuring circuit between the counter and the associated digital indicator. A programmer, which generates the gating pulses to establish the measuring intervals, also emits an updating signal between measuring intervals for loading the register from the counter so as to change, if necessary, the numerical value displayed by the indicator. A restoring signal from the programmer zeroizes the counter before each new measuring interval.

In accordance with a more specific feature of my invention, designed to eliminate digital errors, the outputs of the pulse counter and the buffer register are connected to respective inputs of a digital comparator which causes the connection from the programmer to a control input of the register to be blocked unless the reading of the counter and the contents of the register significantly differ from each other, i.e., unless their difference exceeds a predetermined minimum. This minimum will usually have the value of unity which suffices to prevent erratic changes in loading due to variations of the count by ±1 in the case of a constant pulse frequency.

In accordance with another feature of my invention, the digital error is reduced by the insertion of a frequency divider of step-down ratio $n:1$ between the gate and the counter whereby the latter is stepped after every cycle of $n$ pulses, i.e. upon every passage of the divider through a zero position. In such a case, of course, the reading of the counter and its indicator represents only the $n^{th}$ part of the pulse frequency at the source; in order to conform that reading to the cadence of the pulses as applied to a load, another frequency divider will have to be inserted between the source and the load unless the length of the gating interval is suitably modified to take the factor $n$ into consideration.

Advantageously, pursuant to still another feature of my invention, the programmer transmits prior to each measuring interval a presetting signal to the divider for establishing an initial position thereof, different from its zero position, thereby further reducing the risk of digital errors. In a preferred embodiment, the divider is provided with logical circuitry connected to its output for determining the final divider position at the end of a preceding measuring interval and modifying the initial divider position, established by the presetting signal, in dependence upon that final position. Thus, the logical circuitry may respond to a final zero position of the frequency divider to preset same into an initial position corresponding to a late part of its $n$-pulse cycle, such as an immediate pre-zero position ("$n-1$"), and may respond to a final pre-zero position (e.g. "$n-1$") to preset same into an initial position (e.g. "1") corresponding to an early part of its $n$-pulse cycle.

According to yet a further feature of my invention, means are provided for shifting the beginning and the end of the measuring interval into time positions lying approximately midway between successive pulses to be counted. For this purpose the programmer emits, after the updating and restoring signals, an enabling signal which through a coincidence circuit, such as an AND or NAND gate, prepares the programmer for reception of the next-following pulse of the train to be measured, this pulse giving rise to a start signal which causes the generation of an unblocking signal for the measuring gate. However, in order to prevent the beginning of that unblocking signal for substantially coinciding with the first pulse to be counted (a position liable to bring about a digital error), the actual start of the measuring interval is delayed by a fraction of a cycle of any pulse frequency to be measured. If these pulse frequencies lie within a relatively narrow band, varying by substantially less than a factor or two, the delay may be fixed and amount to about half a pulse cycle at the highest frequency; in other cases the delay should be adjustable under the control of an analog-type frequency discriminator responsive to the cadence of the pulse train.

In order to prevent substantial coincidence of the end of the measuring interval with a pulse to be counted, i.e. to provide a further safety margin against digital errors, I prefer to provide a timing circuit connected to the programmer and to the pulse source for determining the duration of a period between the end of a preceding measuring interval and an immediately following pulse not counted during that interval, this timing circuit controlling the extension of the next-following measuring interval beyond the trailing edge of the unblocking signal from the programmer by a length of time depending on the duration of the aforementioned period. This next-following interval, therefore, terminates a fraction of a pulse cycle after the counting of the last pulse. The control means for extending the measuring interval may comprise a storage circuit for a voltage proportional to the duration of the aforementioned period between the end of the measuring intercal and the uncounted next pulse. The voltage so stored is fed to an ancillary signal generator, such as a monostable multivibrator or monoflop, for producing a supplemental unblocking signal for the measuring gate.

In the event of widely varying pulse frequencies, the off-normal period of the monoflop may also be controllable by the output of an analog-type frequency discriminator in dependence upon the pulse cadence.

BRIEF DESCRIPTION OF THE DRAWING

The above and other features of my invention will now be described in detail with reference to the accompanying drawing in which.

SPECIFIC DESCRIPTION

Figure 1:
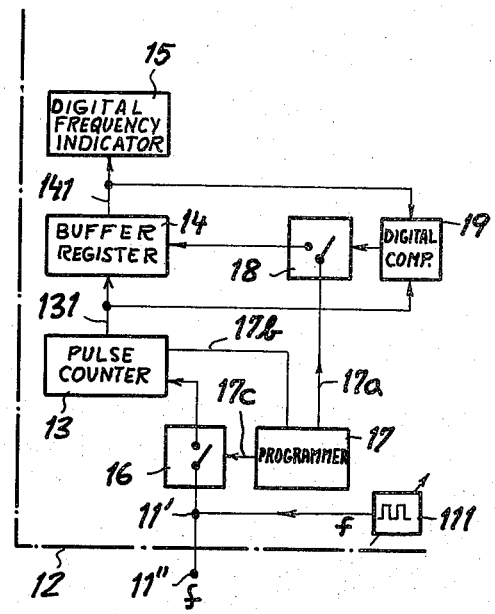
FIG. 1 is a block diagram of a first embodiment of my invention.

In FIG. 1 I have shown a pulse source 111 generating a pulse train of a frequency $f$ to be digitally measured. These pulses are delivered via a junction 11' to an output terminal 11'', connectable to a nonillustrated load, and in parallel therewith to a binary pulse counter 13 in series with a measuring gate 16. Pulse source 111 forms part of a frequency synthesizer 12 whose conventional details have not been shown and which in its basic construction may be similar to the signal generator disclosed in the above-identified U.S. Pat. No. 3,249,888.

Gate 16, normally closed, is periodically opened by an unblocking signal in the form of a broad gating pulse on an output lead 17c of a programmer 17 to establish a measuring interval of predetermined duration. Between successive measuring intervals, programmer 17 delivers to counter 13 on a lead 17b a short pulse acting as a restoring signal for resetting its reading to zero. Regarding the programmer 17 whose conventional details are not shown but reference may be made, for example, to QST magazine, the official journal of the American Radi Relay League, Inc., Vol. LIV, No. 10 of Oct. 1970, pp, 15–23 and 43, see particularly FIG. 5 and description thereof on page 23. One may also mention long-available literature on pocket calculators and the like, such as the Operating and Service Manual of Mar. 1964 for the Hewlett-Packard Model 5245L Electronic Counter.

Pulse counter 13 has a set of output leads, extending from its several stages, which have been collectively designated 131 and are connected in parallel to a corresponding number of stage inputs of a buffer register 14 and of a digital comparator 19. Buffer register 14 has a similar set of output leads, collectively designated 141, which are connected in parallel to a digital frequency indicator 15 and to another set of stage inputs of comparator 19. A further output lead 17a of programmer 17 periodically carries an updating signal in the form of another short pulse, occurring between gating and restoring pulses on leads 17c and 17b, to be delivered to register 14 for making its stages receptive to new data present in the corresponding counter stages; lead 17a includes another gate 18 which is controlled by the comparator 19 to block the transmission of the updating signal whenever the numerical data on both set of imputs, i.e. from counter 13 and from register 14, are equal to each other or differ only by ±1. Thus, the frequency reading displayed by indicator 15 remains unchanged until, in the presence of an updating pulse on lead 17a, there is a significant difference (of two or more units) between the contents of register 14 and the reading of counter 13 as reached at the end of the preceding measuring interval.

Figure 2:
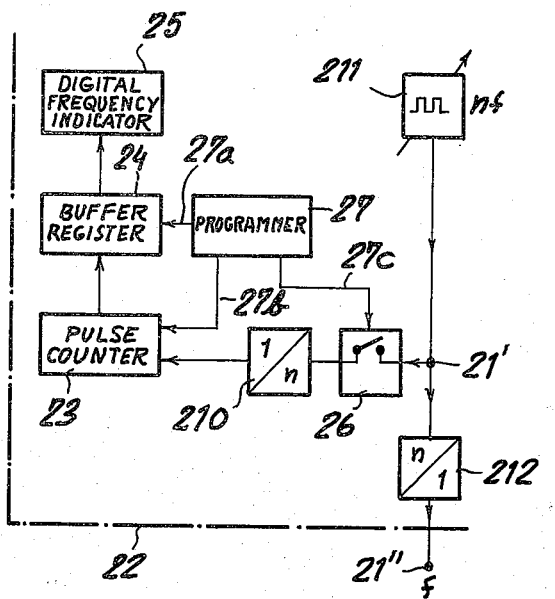
FIG. 2 is a block diagram of a second embodiment.

In FIG. 2, elements corresponding to those of FIG. 1 have been designated by similar reference numerals with substitution of a "2" for the "1" in the position of the tens digit. Output lead 27a of programmer 27, carrying the updating pulse, is here connected directly to buffer register 24. Pulse source 211 has a frequency $nf$ which is stepped down to frequency $f$ by a pair of binary dividers 210 and 212 of division ration $n$:1. Divider 210 lies downstream of measuring gate 26 between pulse counter 23 and junction 21'; divider 212 is inserted between this junction and load terminal 21'' which therefore is energized at cadence $f$. The relative sequence of updating, restoring and gating pulses on leads 27a, 27b and 27c is the same as in FIG. 1.

It will be understood that the two dividers 210 and 212 need not necessarily have the same step-down ratio $n$:1 and that, in fact, divider 212 could be omitted if proper allowance is made in the duration of the measuring interval as established by the gating pulse on lead 27c. Thus, for example, a measuring interval of $n$ seconds will provide a pulse count equaling the numerical value of input frequency $nf$.

Figure 3:
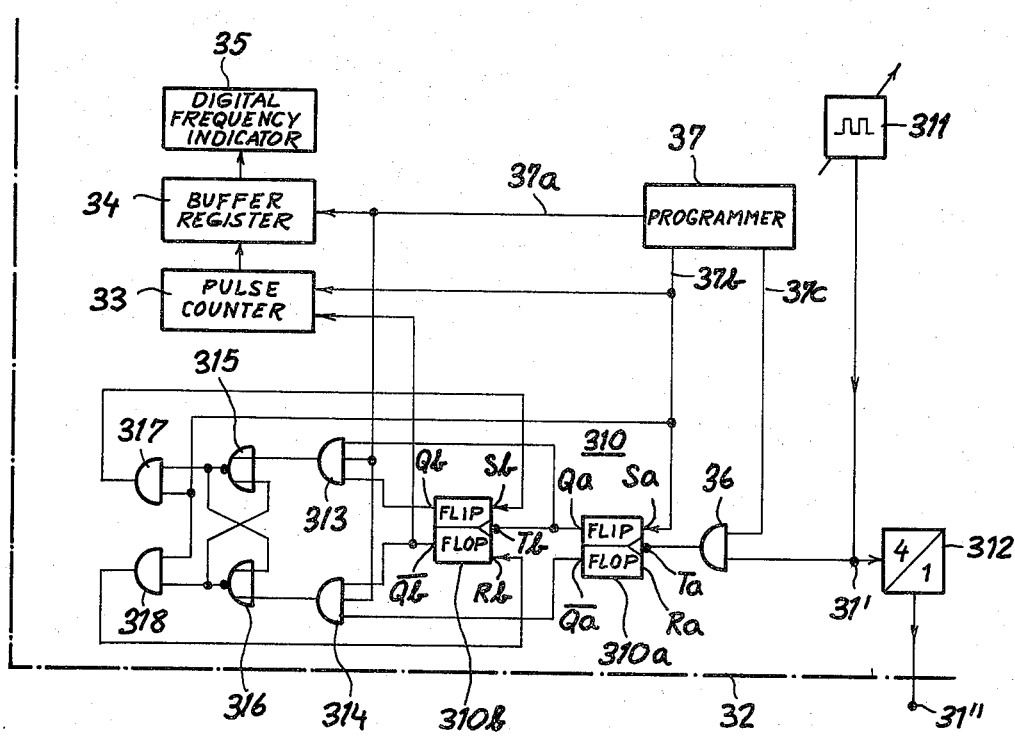
FIG. 3 is a block diagram of a modification of the embodiment of FIG. 2.

In FIG. 3 I have shown a further development of the system of FIG. 2 with corresponding elements designated by similar reference numerals having the "2" in their tens or hundreds digit replaced by a "3". Frequency dividers 310 and 312 have a step-down ratio of 4:1; each of these dividers may thus consist of two binary stages in cascade as illustrated at 310a and 310b for divider 310. The two divider stages are flip-flops of the J–K type, with central triggering inputs $Ta$, $Tb$ and with collateral setting and resetting inputs $Sa$, $Sb$ and $Ra$, $Rb$. (Input $Ra$ of stage 310a is not used.) As is well know per se, any pulse applied to the triggering input reverses the previous condition of the flip-flop; in the absence of such triggering pulses, the flip-flop can be selectively set or reset by energization of the corresponding collateral input.

Stage 310a has a set output $Qa$ and a reset output $\overline{Qa}$; similarly, stage 310b has set and reset outputs $Qb$ and $\overline{Qb}$. Programmer lead 37c is connected via measuring gate 36 to triggering input $Ta$ which inverts and differentiates the gating pulse so as to respond to the trailing edge of that pulse. First-stage output $Qa$ extends to triggering input $Tb$, which also inverts and differentiates so as to respond to the de-energization of that output, and also to one of the three inputs of an AND gate 313; the other output $\overline{Qa}$ of that stage terminates at an input of a similar AND gate 314. Second-stage output $Qb$ is connected to another input of AND gate 313; its companion output $\overline{Qb}$ is tied to another input of AND gate 314 and in parallel therewith to a stepping input of counter 33. Setting input $Sa$ is tied to programmer lead 37b to receive the restoring pulse therefrom which acts to preset the divider 310 to an off-zero position characterized by the setting of at least its first-stage flip-flop 310a. Programmer leas 37a, carrying the updating pulse, is tied to the remaining inputs of AND gates 313 and 314.

A further flip-flop, consisting of two cross-connected NOR gates 315 and 316, has respective inputs tied to the outputs and AND gates 313 and 314. NOR gates 315 and 316 work into a pair of AND gates 317 and 318 which also receive, on their second inputs, the restoring and presetting pulse appearing on programmer lead 37b. The outputs of AND gates 317 and 318 are tied to the second-stage setting and resetting inputs $Sb$ and $Rb$, respectively, of frequency divider 310.

Upon the occurrence of the updating pulse on lead 37a at the end of each measuring interval, AND gate 314 conducts if frequency divider 310 is in its No. 0 position (stages 310a, 310b both reset) whereas AND gate 313 conducts if that divider occupies its No. 3 position (stages 310a and 310b both set) at the end of a measuring interval. Conduction of gate 313 cuts off the NOR gate 315 if it was previously conductive; this establishes a position in which flip-flop 315, 316 opens the AND gate 318 for passage of the next restoring pulse on lead 37b. As a result, divider stage 310b is reset by the restoring pulse simultaneously with the setting of stage 310a by the same pulse, causing the divider to assume its position No. 1. If, on the other hand, the final position of the divider at the end of a measuring interval is the No. 0 position, the conduction of AND gate 314 cuts off the NOR gate 316 (if it was previously conductive) and enables the AND gate 317 to pass the subsequent restoring pulse to input $Sb$ for setting the stage 310b simultaneously with stage 310a, thereby establishing the No. 3 or pre-zero position of divider 310. If the end of a measuring interval finds the divider in one of its intermediate positions, i.e. No. 1 or No. 2, the position of flip-flop 315, and 316 remains unchanged so that the next measuring interval again finds the divider 310 in position No. 1 or No. 3.

Let us now consider an example of the measurement of the frequency $f$ of a square wave appearing on load terminal 31", in the output of divider 312, as a result of a pulse train of cadence $4f$ emitted by source 311.

As has been shown above, divider 310 stands in either its No. 1 or its No. 3 position upon the opening of gate 36 by an unblocking pulse on lead 37c. It will be assumed in this instance that the initial divider position is No. 1. The divider will then pass through the following positions, during a measuring interval, in response to successive pulses from source 311:

1 2 3/0 1 2 3/0 1 2 ... 3/0 1 2 3/0 1 2 (first cycle)

with the number $m$ of 3/0 transitions registered in counter 33 as a measure of output frequency $f$ (e.g. $m$ = 1436).

If the pulse frequency now increases slightly, or if it remains substantially unchanged but a phase shift occurs between the incoming pulse train and the gating signal from the programmer, this sequence may result next:

1 2 3/0 1 2 3/0 1 2 ... 3/0 1 2 3/0 1 2 3 (second cycle)

with no change in the number $m$ of 3/0 transitions stepping the counter 33.

A small rise in pulse frequency will now yield:

1 2 3/0 1 2 3/0 1 2 ... 3/0 1 2 3/0 1 2 3/0 (third cycle)

with an increase in the number $m$ by one unit (e.g. $m$ = 1437).

If the presetting of divider 310 were not modified at this point, the next sequence (in response to another phase shift) could be thus:

1 2 3/0 1 2 3/0 1 2 ... 3/0 1 2 3/0 1 2 3 which would reduce the count $m$ to its previous value (1436) so as to introduce a digital error of significant magnitude since it may conceal two cumulative frequency increments.

With the system of FIG. 3 operating as described above, however, the next sequence is:

3/0 1 2 3/0 1 2 3/0 ... 1 2 3/0 1 2 3/0 1 (fourth cycle)

preserving the more correct count $m$ (1437) obtained in the third cycle.

If the slightly higher frequency of the second cycle had been already present in the first cycle to make the sequence thereof read:

1 2 3/0 1 2 3/0 1 2 ... 3/0 1 2 3/0 1 2 3

(with $m$ still at its original value of 1436), a phase shift on the second cycle could have produced the sequence:

1 2 3/0 1 2 3/0 1 2 ... 3/0 1 2 3/0 1 2 3/0 with a permissible increase in the count by one unit ($m$ = 1437). This count would have been preserved upon a subsequent return to the former phase position, i.e. with the sequence:

3/0 1 2 3/0 1 2 3/0 ... 1 2 3/0 1 2 3/0 1 which is identical with that of the fourth cycle, above. It should be noted that any modification of this sequence by the addition or subtraction of one divider position does not alter the magnitude of that count. Therefore, despite phase shifts and minor frequency fluctuations, the reading of indicator 35 will remain unchanged until a significant frequency variation occurs.

Figure 4:
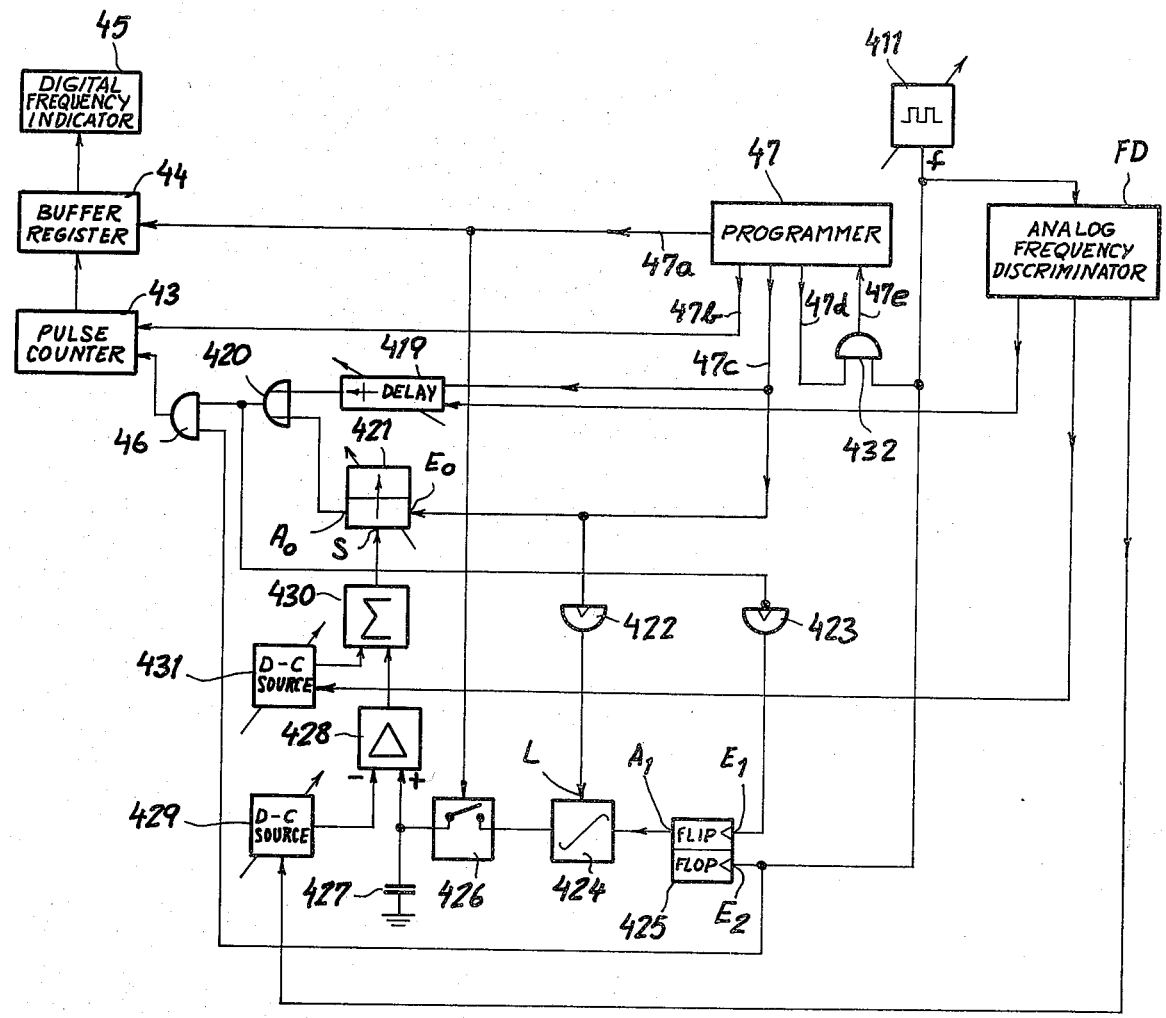
FIG. 4 is a block diagram of a further embodiment.
Figure 5:
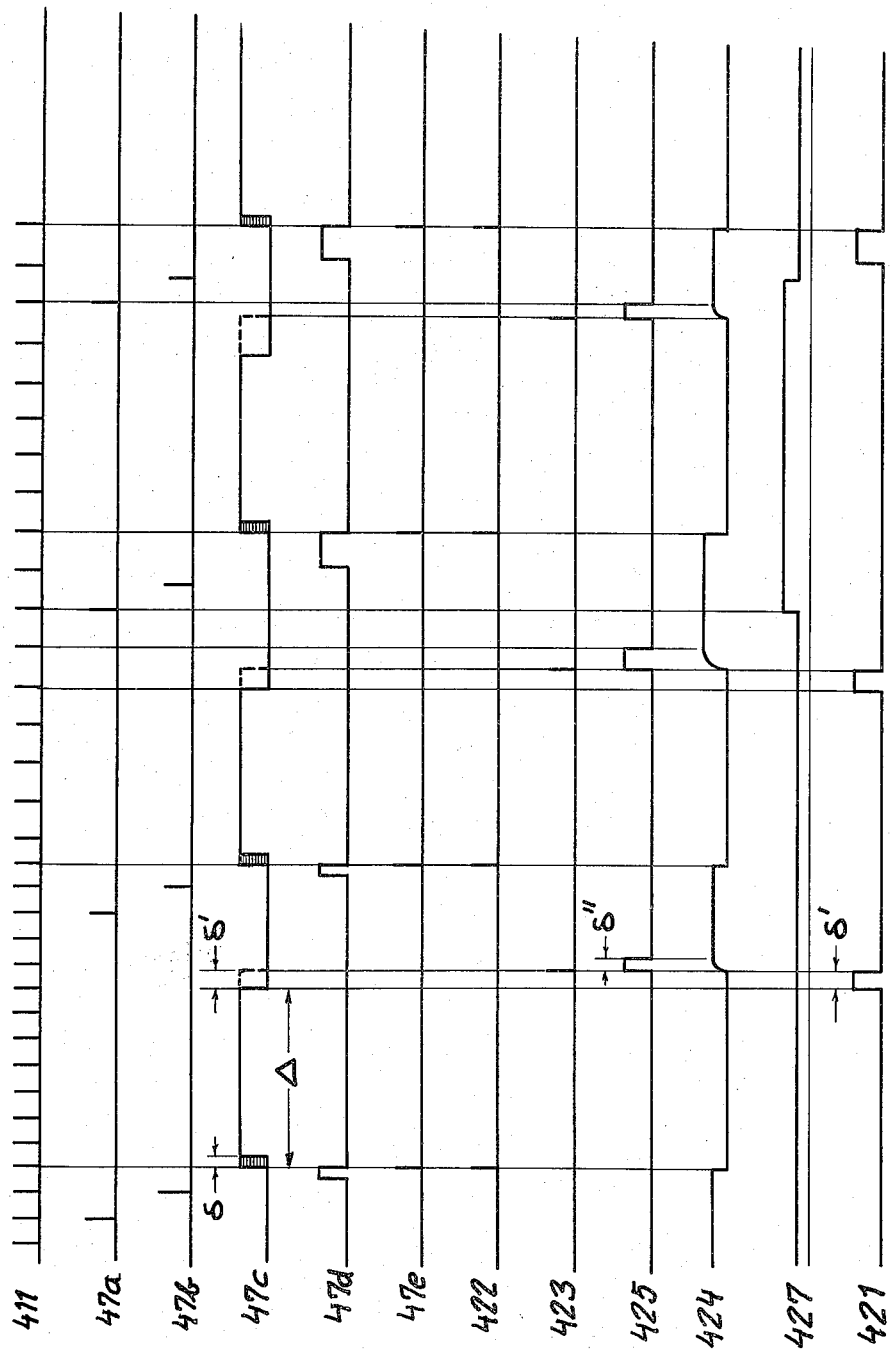
FIG. 5 is a set of graphs relating to the operation of the system of FIG. 4.

In FIG. 4, in which reference numerals designating previously described elements differ from those used earlier by the presence of a "4" in their first digit, the connection from programmer output 47c to measuring gate 46 includes a delay circuit 419 and an OR gate 420 in cascade. Delay circuit 419 retards only the leading edge of a gating pulse emitted by the programmer, as illustrated by the shaded portions of graph 47c in FIG. 5; the extent of this retardation δ is about half a cycle of the highest pulse frequency in the output of source 411. In the corresponding designated graph of FIG. 5, that pulse frequency varies from its maximum value to a substantially lower level. Graphs 47a and 47b of FIG. 5 show the updating and restoring pulses respectively transmitted by the programmer to buffer register 44 and pulse counter 43; the relative time position of the pulses on leads 47a, 47b and 47c indicated in FIG. 5 is approximately the same as in the preceding embodiments, though it will be understood that the spacings of these pulses and the length of the measuring interval are given only by way of example and are not critical.

The unilaterally effective delay circuit 419 may include, for instance, a shunt impedance consisting of a Zener diode in series with an R/C network, the Zener breaking down on the leading edge of a gating pulse but returning to its high-resistance state upon the charging of the R/C network to a predetermined voltage level.

Programmer 47 has a further output 47d extending to an input of an AND gate 432 whose second input receives the incoming pulses to be counted. Lead 47d is energized (see corresponding graph of FIG. 5) before lead 47c and opens the AND gate 432 to the next incoming pulse which thus results in the generation of a start signal on the output lead 47e of that gate. This start signal, shown in graph 47e of FIG. 5, terminates the energization of lead 47d and triggers the programmer 47 into emitting on lead 47c a gating pulse of duration Δ whose leading edge therefore always coincides with an incoming pulse; owing to the delay δ introduced by cirtuit 419, the leading edge of the retarded gating pulse reaching the AND gate 46 always lies between incoming pulses.

OR gate 420 has a second input tied to an off-normal output $A_0$ of a monostable multivibrator or monoflop 421 whose triggering input $E_0$ is tied to programmer lead 47c to respond to the trailing edge of the gating pulse. The off-normal period of monoflop 421 is controllable by a biasing voltage of an input S thereof energized via a summing circuit 430 from the output of a differential amplifier 428 superimposed upon a d-c voltage from a source 431. Amplifier 428 has a subtractive input (−), biased by a similar d-c source 429, and an additive input (+), connected to a storage capacitor 427. This capacitor is chargeable, via a normally open switch 426, from an integrating circuit 424 connected to the set output $A_1$ of a flip-flop 425; integrator 424 can be discharged by the energization of an unloading input L thereof. Input L is connected to lead 47c through a differentiation circuit 422 which, as shown by the correspondingly designated graph of FIG. 5, conducts in response to the leading edge of the undelayed gating pulse to reduce the output of integrator 424 to zero. Flip-flop 425 has a setting input $E_1$ which is connected to the output of OR gate 420 through another (inverting) differentiator 423 responding, as indicated in the corresponding graph of FIG. 5, to the trailing edge of the gating signal in the output of that OR gate, this trailing edge being retarded by a delay δ' (i.e. the off-normal period of monoflop 421) with reference to the end of the original gating pulse as indicated in dotted lines on graph 47c and as more fully described hereinafter. A resetting input $E_2$ of flip-flop 425 is connected to the output of pulse source 411.

At the very instant when the undelayed trailing edge of the original gating pulse passes the OR gate 420, monoflop 421 is tripped to extend the time of conductivity of that OR gate by the aforementioned period δ' whose duration depends on the output voltage of summer 430 and therefore on the charge of capacitor 427.

When the monoflop returns to normal so as to de-energize its output $A_0$, differentiator 423 responds and sets the flip-flop 425 as indicated by the graph so designated in FIG. 5. The next incoming pulse from source 411 resets the flip-flop which therefore measures a period δ'' between the end of the actual gating interval, i.e. the termination of conductivity of gates 420 and 46, and the immediately following pulse not counted during that interval. The previously discharged integrator 424 is reloaded during this period δ'', as illustrated in graph 424 of FIG. 5, to a level depending on the length of that period. Shortly thereafter, the enabling pulse on lead 47a closes the switch 426 to equalize the charge of capacitor 427 with that of the integrator as indicated by the correspondingly designated graph in FIG. 5. The delay δ' is therefore a function of period δ'' and, through a suitable setting of voltage sources 429 and 431, may be so adjusted that for δ'' = δ, i.e. with the flip-flop 425 active for about half a cycle of the highest pulse frequency, amplifier 428 has no output so that control input S of monoflop 421 receives only the voltage of source 431 designed to make its off-normal period δ' equal to the delay δ. This off-normal period has been indicated in graph 421 of FIG. 5.

In the case last assumed, therefore, the duration Δ − δ + δ' of a measuring interval equals the length Δ of the gating pulse emitted by programmer 47 on its output lead 47c. In any event, both the beginning and the end of that interval fall between consecutive pulses delivered by source 411.

It will be apparent that with widely varying pulse frequencies $f$ the delay δ, based upon the highest pulse frequency, may not provide a sufficient safety margin against digital errors at lower pulse frequencies. In such a situation, therefore, I prefer to provide an analog-type frequency discriminator FD receiving the output of source 411 and working into respective control inputs of delay circuit 419 and voltage sources 429, 431 for modifying their operation to vary the delays δ and δ' with frequency $f$ so that the beginning and the end of a measuring interval will always occur approximately midway in a pulse cycle. It will be evident that the output voltage of discriminator FD need only be roughly proportional to pulse frequency $f$ in order to insure this result.

I claim:

1. A system for measuring the output frequency of a source of recurrent pulses, comprising:
   a metering circuit connected to receive the pulses of said source;
   a normally closed gate in said circuit;
   programming means connected to said gate for repeatedly opening same to establish a measuring interval;
   a pulse counter in said circuit connected to said source by way of said gate, said programming means being connected to said counter for setting same to zero before each measuring interval;
   a buffer register in said circuit connected to said counter and loadable by the latter in response to an updating signal emitted by said programming means between measuring intervals; and
   digital indicator means connected to said register for displaying the contents thereof;
   said register being provided with a control input connected to said programming means for receiving said updating signal therefrom, further comprising blocking means in the connection between said programming means and said control input, and comparison means with input connections to the outputs of said counter and of said register for deactivating said blocking means only in the presence of a difference greater than a unit count between the reading of said counter and the contents of said register.

2. A system for measuring the output frequency of a source of recurrent pulses, comprising:
   a metering circuit connected to receive the pulses of said source; a normally closed gate in said circuit;
   programming means connected to said gate for repeatedly opening same to establish a measuring interval;
   a pulse counter in said circuit connected to said source by way of said gate, said programming means being connected to said counter for setting same to zero before each measuring interval;
   a buffer register in said circuit connected to said counter and loadable by the latter in response to an updating signal emitted by said programming means between measuring intervals;

digital indicator means connected to said register for displaying the contents thereof; and a frequency divider of step-down ratio $n:1$ inserted in said circuit between said gate and said counter for stepping the latter on passing through a zero position at the end of every n-pulse cycle, said frequency divider being connected to said programming means for receiving therefrom a presetting signal establishing prior to each measuring interval an initial position different from said zero position;

said frequency divider being provided with logical means connected to the output thereof for determining the final position of said frequency divider at the end of a preceding measuring interval and modifying said initial position in dependence upon said final position.

3. A system as defined in claim 2 wherein said logical means is responsive to a final zero position of said frequency divider to preset same into an initial position corresponding to a late part of said n-pulse cycle, said sensing means being responsive to a final pre-zero position of said frequency divider to preset same into an initial position corresponding to an early part of said n-pulse cycle.

4. A system for measuring the output frequency of a source of recurrent pulses, comprising:

a metering circuit connected to receive the pulses of said source;

a normally closed gate in said circuit;

programming means connected to said gate for repeatedly opening same to establish a measuring interval;

a pulse counter in said circuit connected to said source by way of said gate, said programming means being connected to said counter for setting same to zero before each measuring interval, said programming means emitting an enabling signal following the emission of said updating signal and the zero-setting of said counter;

a buffer register in said circuit connected to said counter and loadable by the latter in response to an updating signal emitted by said programming means between measuring intervals;

digital indicator means connected to said register for displaying the contents thereof;

coincidence means responsive to the occurrence of a pulse from said source in the presence of said enabling signal for triggering programming means into generation of an unblocking signal for said gate; and delay means for said unblocking signal between said programming means and said gate for retarding the beginning of a measuring interval by a fraction of a cycle of any pulse frequency to be measured.

5. A system as defined in claim 4, further comprising timing means connected to said programming means and to said source for determining the duration of a period between the end of a preceding measuring interval and an immediately following pulse from said source, and control means responsive to said timing means for extending the next-following measuring interval beyond the end of said unblocking signal by a length of time depending on said duration to terminate said next-following interval a fraction of a pulse cycle after the counting of the last pulse.

6. A system as defined in claim 5 wherein said control means comprises storage means for a voltage proportional to said duration and generator means responsive to said voltage for producing a supplemental unblocking signal for said gate.

7. A system as defined in claim 6, further comprising analog-type frequency-discriminating means connected to said source; said delay means and said generator means having control inputs connected to said frequency-discriminating means for varying the retardation of the beginning of a measuring interval and the extension thereof in dependence upon the recurrence rate of said pulses.

* * * * *